US010455438B2

(12) United States Patent
Bisada

(10) Patent No.: US 10,455,438 B2
(45) Date of Patent: Oct. 22, 2019

(54) TELECOM MONITORING AND ANALYSIS SYSTEM

(71) Applicant: T-Mobile USA, Inc., Bellevue, WA (US)

(72) Inventor: Emad Tawfik Bisada, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 32 days.

(21) Appl. No.: 15/474,888

(22) Filed: Mar. 30, 2017

(65) Prior Publication Data

US 2018/0287901 A1  Oct. 4, 2018

(51) Int. Cl.
*H04W 24/08* (2009.01)
*H04L 12/24* (2006.01)
*H04W 24/10* (2009.01)

(52) U.S. Cl.
CPC .......... *H04W 24/08* (2013.01); *H04L 41/069* (2013.01); *H04L 41/0631* (2013.01); *H04W 24/10* (2013.01)

(58) Field of Classification Search
CPC .......... H04L 43/04; H04L 24/08; H04L 23/06
See application file for complete search history.

(56) References Cited

U.S. PATENT DOCUMENTS

| 7,904,929 B1* | 3/2011 | Jaunin | G06Q 30/0256 705/14.54 |
| 9,306,962 B1* | 4/2016 | Pinto | H04L 63/1416 |
| 2007/0088534 A1* | 4/2007 | MacArthur | G05B 13/0295 703/17 |
| 2010/0158236 A1* | 6/2010 | Chang | H04M 3/5175 379/265.03 |
| 2015/0039747 A1* | 2/2015 | Meloche | H04L 43/04 709/224 |
| 2015/0039775 A1* | 2/2015 | Benner | H04L 65/1006 709/228 |

* cited by examiner

*Primary Examiner* — Muthuswamy G Manoharan
(74) *Attorney, Agent, or Firm* — Lee & Hayes, P.C.

(57) ABSTRACT

A Telecom Monitoring and Analysis System (TMAS) can be utilized to automatically collect and analyze session logs for troubleshooting a session degradation and/or a session failure within a telecommunications network. The TMAS may receive an access request from an authorized user for purposes of troubleshooting a session degradation/failure associated with a particular subscription with an operator of the telecommunications network. The authorized user may provide an identifier associated with the subscription, and the TMAS can then query one or multiple dedicated monitoring systems for past session logs associated with the identifier. Upon receipt of the past session logs, the TMAS may generate, without user intervention, a report, based at least in part on the past session logs, the report including session degradation and/or failure information. The past session logs and/or the generated report may be sent to a user device of the authorized user.

20 Claims, 8 Drawing Sheets

TELECOM MONITORING AND ANALYSIS SYSTEM

BACKGROUND

Problems can occur within a telecommunications network that cause degradation and/or failure of communications sessions (e.g., voice calls). Session degradations/failures can be exhibited in data packet loss and/or packet queuing delay, which can result in an ability to establish a connection, a dropped session, or similar data communication d connection issues. Due to the complex network topologies of today's telecommunications networks, there can be a wide variety of root causes for a session degradation/failure. For example, a user equipment (UE) can be faulty (e.g., faulty hardware and/or software, such as a bug in a newly launched application), there can be poor radio coverage in a location of the UE, and/or a component(s) (or node(s)) of the telecommunications network can be faulty, to name only a few potential root causes of session degradations/failures. If remedial action is not taken to fix these issues, the telecommunications network can provide poor quality of service (QoS) and/or become inoperable for providing service to subscribing users.

In order to troubleshoot network issues, telecom operators have introduced monitoring tools that enable them to trace call failures at the various segments of the call path. For example, specialized monitoring tools and systems have been developed to monitor the Internet Protocol Multimedia Subsystem (IMS) domain, the Circuit Switched (CS) domain, the Evolved Packet Core (EPS), the Radio Access Network (RAN), the air interface and the UE. A telecom operator may utilize any number of these tools, depending on the diversity of the network services. Also, depending on the size of the operator's service area, the operator may decide to have separate tools monitoring different geographical regions within the service area.

Localizing the root cause of a session failure using existing technology requires extensive manual interaction, and expertise, with multiple disparate tools and systems. In an illustrative example, a telecom operator may receive information that Voice over Long Term Evolution (VoLTE) calls are being dropped, perhaps along with general locations and/or times associated with the reported dropped calls. In order to troubleshoot the issue for a dropped call, a system expert, with proper access credentials, must login to, and collect call logs from, a first tool that monitors the IMS domain. This may be followed by a login to, and a collection of call logs from, a second tool that monitors the EPC and RAN. This may be followed by yet another login to, and a collection of call logs from, a third tool that monitors the air interface portion of the telecommunications network, as well as additional potential logins to other systems that monitor other portions of the network, such as a system that monitors the UE itself. On top of this, before troubleshooting the session failure, the system expert may also manually obtain data (e.g., an International Mobile Subscriber Identity (IMSI), device type of the UE, software version/build of the UE, radio frequency (RF) characteristics at the drop location, etc.) from other tools/data sources in order to provide needed context to the call logs collected by the aforementioned dedicated monitoring systems.

Needless to say, the use of multiple, disparate tools/systems to collect the data needed to troubleshoot a session failure is extremely time consuming. Even with respect to a single monitoring system that monitors a particular portion (e.g., the core network) of the telecommunications network, an expert user generally must wait for a significant period of time after issuing a log collection request until the call logs are finally collected and downloaded to the user's computer, which can be a lengthy process. When this is compounded across multiple disparate monitoring systems, as well as other data sources utilized for troubleshooting session failures, the end-to-end troubleshooting process becomes inordinately time consuming and complex from the user's standpoint. In addition, very few people have the expertise needed to access, and collect logs from, the multiple disparate tools/systems noted above. Often multiple experts are needed to collect session logs for a single session failure due to the multiple disparate tools/systems involved. Once call logs are finally collected, expertise is also needed to visually inspect and correlate the call logs obtained from various disparate monitoring systems in order to localize a root cause of a session failure. This dependency on scarce expertise is a significant limitation on many telecom operators who are tasked with troubleshooting a high number of session failures. Furthermore, with the regular introduction of new products, services, and capabilities, the demand for such troubleshooting is only increasing.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
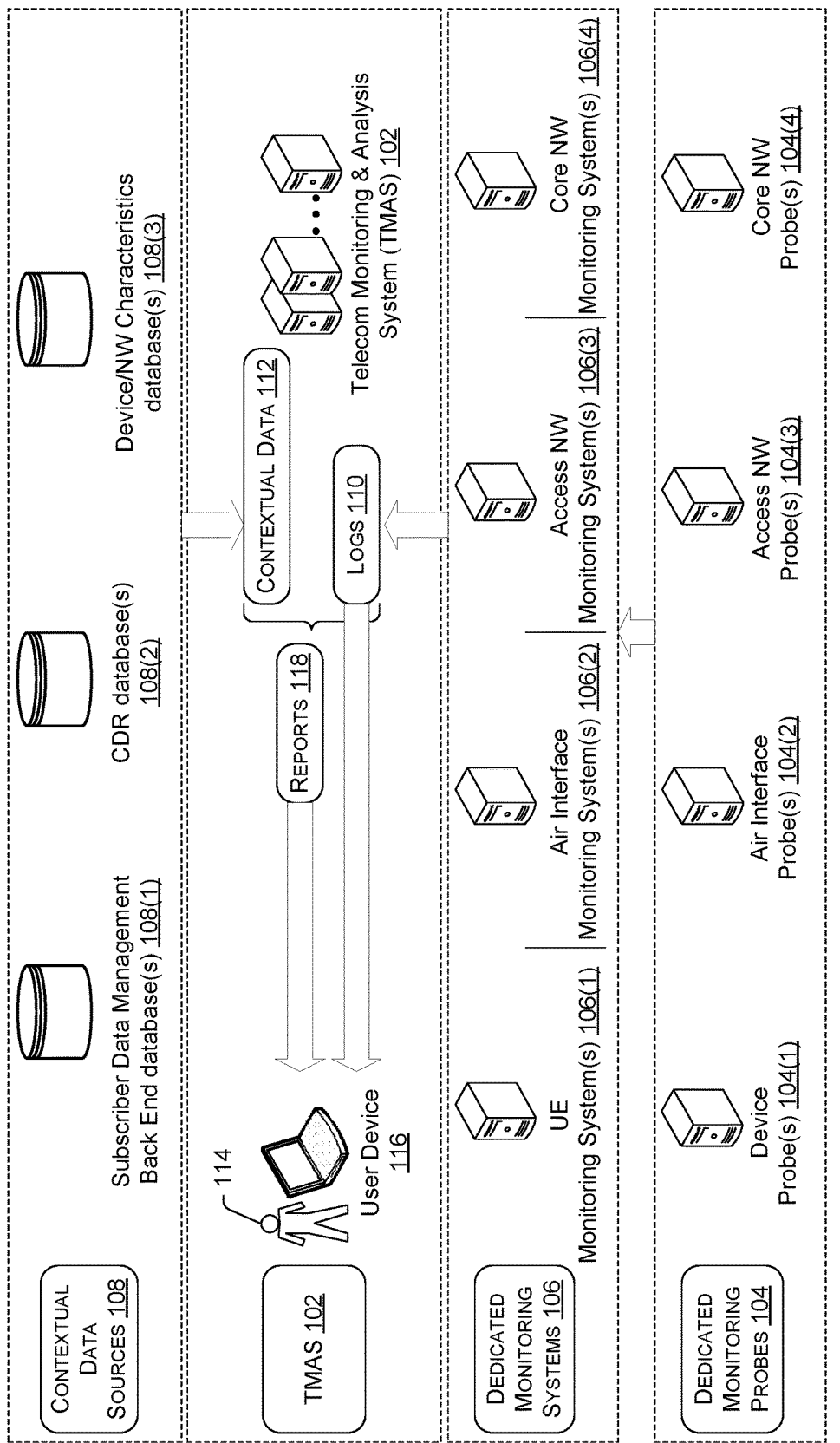
FIG. 1 illustrates an example environment for implementing a Telecommunications Monitoring and Analysis System (TMAS).

Described herein is a system (often referred to herein as a Telecom Monitoring and Analysis System (TMAS)) that allows for automated collection of session logs from multiple dedicated monitoring systems that monitor disparate systems, domains, and regions of a telecommunications service provider network. The session logs can be collected with the objective of troubleshooting a session degradation and/or a session failure within the telecommunications network. Utilization of the TMAS for automated log collection, and possibly for automated log analysis, streamlines and simplifies the collection of session logs as compared to existing technologies available today.

The TMAS may receive a request from an authorized user to access the TMAS for monitoring session degradations and/or session failures in a telecommunications network. In order to troubleshoot a session degradation/failure associated with a particular subscription (or account) with an operator of the telecommunications network, the authorized user may provide an identifier (e.g., a subscription identifier, such as a mobile station international subscriber directory number (MSISDN)) to the TMAS. The TMAS can then query one or multiple dedicated monitoring systems for past session logs associated with the identifier. Upon receipt, the past session logs can be sent to the user device of the authorized user.

The TMAS may also be configured to automatically analyze the collected session logs and generate a report without any user intervention, based at least in part on the past session logs. The report generated by the TMAS may be sent to the authorized user's computing device or system, and may include session degradation information or session failure information, which may allow the authorized user to identify a root cause of a session degradation or a session failure in the telecommunications network. In some embodiments, the TMAS may query one or more data sources for contextual data associated with the past session logs, and may use at least some of the contextual data to generate the report.

In some embodiments, the TMAS may execute an automation script specified by an authorized user in order to query the dedicated monitoring system(s) for past session logs. In other embodiments, the TMAS can provide a user interface or a command line interface that is configured to receive user-specified parameters for querying the dedicated monitoring system(s) for past session logs. Such user-specified parameters may include at least a subscription identifier, such as a MSISDN.

In some embodiments, the ability of the TMAS to query multiple disparate monitoring systems and data sources is enabled via the invocation of application programming interfaces (APIs) that allow the TMAS to programmatically interface with, and query, the individual monitoring systems/tools/data sources.

The TMAS's ability to programmatically query multiple disparate systems/tools/data sources, as described herein, allows the TMAS to autonomously obtain (and possibly analyze), on behalf of an authorized user, session logs associated with multiple different portions of the telecommunications network (e.g., the core network portion, the access network portion, the air interface portion, the UE, etc.), all without requiring the user to independently access the multiple disparate monitoring systems and data sources himself/herself. That is, the authorized user can submit a request via a single interface to the TMAS—acting as an intermediary between the authorized user and the monitoring systems/data sources—to have the TMAS programmatically collect and analyze session logs across multiple portions of the telecommunications network. In this manner, the time required to troubleshoot a session degradation/failure can be significantly reduced by virtue of the reduced time spent by the authorized user for the collection of session logs. This also provides an "end-to-end" view of the call or session flow through the operator telecommunications network through a single query/interface to the TMAS, which significantly simplifies and streamlines the log collection and analysis process, as compared to existing technologies and tools available today. As an example, an authorized user can request the TMAS to collect logs across multiple portions of the telecommunications network and generate reports in the background, thereby allowing the authorized user to submit the request and check back, at a later time, regarding the status of the log collection and/or the report generation.

Furthermore, use of the TMAS does not require expertise in any of the disparate monitoring systems or tools available for collecting troubleshooting data. Rather, a relatively unsophisticated user can operate the TMAS (e.g., through an easy-to-use graphical user interface), and the TMAS can perform the "heavy lifting" on the back end to collect and analyze session logs of interest for troubleshooting session degradations and/or failures.

Although the techniques and systems disclosed herein are predominantly described with respect to implementation in a cellular network environment, and in particular, call sessions, this disclosure is not limited to such implementations. That is, the techniques and systems described herein may be implemented for troubleshooting any suitable type of communication session (e.g., instant messaging, online gaming, video conferencing, cable communications, etc.), and may also be implemented in any suitable network with any network topology and/or networking protocol, including data center networks, wide area networks, local area networks, peer-to-peer networks, mesh networks, and so on.

FIG. 1 illustrates an example environment 100 for implementing a Telecommunications Monitoring and Analysis System (TMAS) 102. The TMAS 102 can be utilized to enable automated collection and analysis of session logs for troubleshooting a session degradation and/or a session failure within a telecommunications network.

The environment 100 shown in FIG. 1 includes, from the bottom up, a plurality of dedicated monitoring probes 104, a plurality of dedicated monitoring systems 106, the TMAS 102, and a plurality of contextual data sources 108. The dedicated monitoring probes 104 include, without limitation, one or more device probes 104(1), one or more air interface probes 104(2), one or more access network probes 104(3), and one or more core network probes 104(4), which are configured to tap traffic from respective portions of a telecommunications network. For example, the device probe(s) 104(1) may represent a probe(s) that is configured to monitor user equipment (UE) as the UEs access the telecommunications network. Such monitoring may include capturing signals generated, received, transmitted, relayed, and/or routed via the UE. In some embodiments, the device probe(s) 104(1) may include a database(s) that collects and maintains traces (e.g., trace files including an identifier associated with the UE, timestamps, data packets, etc.) of such UE signals.

The air interface probe(s) 104(2) may be coupled to an air (or radio) interface portion of the telecommunications network. The air interface portion of the telecommunications network may include any portion(s) of the telecommunications network associated with over-the-air transmissions to/from a base station (e.g., an Evolved NodeB (eNodeB)). For example, the air interface probe(s) 104(2) may represent a probe(s) that is configured to monitor over-the-air transmissions with respect to a base station (e.g., a cell site). Such monitoring may include capturing signals generated, received, transmitted, relayed, and/or routed via the base station. In some embodiments, the air interface probe(s) 104(2) may include a database(s) that collects and maintains traces (e.g., trace files including an identifier associated with an air interface network component, timestamps, data packets, etc.) of such signals.

The access network probe(s) 104(3) may be coupled to one or more access networks of the telecommunications network. The access network may provide a UE access to a core network portion of the telecommunications network. The access network portion of the telecommunications network can include, without limitation, one or more of the EPC portion of the telecommunications network, various radio access networks (RANs) utilizing any suitable radio access technology (RAT), such as, without limitation, a Global System for Mobile Communications (GSM)/Enhanced Data GSM Environment (EDGE) RAN (GERAN), a Universal Terrestrial RAN (UTRAN), an evolved UTRAN (E-UTRAN), and/or a Wi-Fi RAN, and the like. For example, the access network probe(s) 104(3) may represent a probe(s) that is configured to monitor one or more access network nodes of the telecommunications network. Such monitoring may include capturing signals generated, received, transmitted, relayed, and/or routed via the access network node(s). In some embodiments, the access network probe(s) 104(3) may include a database(s) that collects and maintains traces (e.g., trace files including an identifier associated with the access network node, timestamps, data packets, etc.) of such signals.

The core network probe(s) 104(4) may be coupled to one or more core networks of the telecommunications network, such as an Internet Protocol Multimedia Subsystem (IMS) core network (sometimes referred to as the "IMS core", the "Core Network (CN)," or the "IM CN Subsystem"), and/or a core network of circuit-switched (CS) and Packet Switched (PS) domains. IMS is an architectural framework defined by the 3$^{rd}$ Generation Partnership Project (3GPP) for delivering Internet Protocol (IP) multimedia to UEs of the IMS network. The core network(s) of the telecommunications network can therefore permit wireless and wireline devices to access IP multimedia, messaging, and voice applications and services. IMS allows for peer-to-peer communications, as well as client-to-server communications over an IP-based network. For example, the core network probe(s) 104(4) may represent a probe(s) that is configured to monitor one or more core network nodes (e.g., IMS nodes) of the telecommunications network. Such monitoring may include capturing signals generated, received, transmitted, relayed, and/or routed via the core network node(s). In some embodiments, the core network probe(s) 104(4) may include a database(s) that collects and maintains traces (e.g., trace files including an identifier associated with core network node, timestamps, data packets, etc.) of such signals.

Although four dedicated monitoring probes 104 are shown in FIG. 1 for capturing signals from the respective portions of the telecommunications network, it is to be appreciated that the number of dedicated monitoring probes 104 shown in FIG. 1 is not limiting, as fewer or greater dedicated monitoring probes 104 can be utilized. In general, technology to implement the dedicated monitoring probes 104 is known to a person having ordinary skill in the art. The dedicated monitoring probes 104 are configured to capture signals generated, received, transmitted, relayed, and/or routed via particular components (or nodes) of the telecommunications network to which the probes 104 are coupled. This allows for the dedicated monitoring systems 106 to collect and maintain session logs 110 with respect to communication sessions that are established on the telecommunications network.

"Session logs" 110 as used herein may include data pertaining to any type of communication session that may be established on the telecommunications network. An operator of the telecommunications network may offer various types of IMS-based services, including, without limitation, telephony services, emergency services (e.g., E911), gaming services, instant messaging services, presence services, video conferencing services, social networking and sharing services, location-based services, content streaming services, push-to-talk services, and so on. Accordingly, a communication session established on the telecommunications network can pertain to any suitable type of service typically provided by such a telecom operator (or service providing entity). Many of the examples described herein pertain to communication sessions in the form of "calls" where voice data is transmitted between components (or nodes) of the telecommunications network as part of a voice call. In some embodiments, this type of communication session may be established as a Voice over Long Term Evolution (VoLTE) call session. For a given communication session, the session logs 110 can include any suitable information including data packets, identifiers included in the data packets, timestamps, and the like.

As noted above, the dedicated monitoring systems 106 can utilize the dedicated monitoring probes 104 to collect data from the dedicated monitoring probes 104 in real time. The collected data may include any data (e.g., session logs 110) pertaining to communication session established via the telecommunications network. The dedicated monitoring systems 106 may archive the data in memory and retain the data for a predetermined period of time. Based on the nature of the data, the retention can vary from a couple of days to several months. Accordingly, the session logs 110 may be purged from the memory accessible to the dedicated monitoring system 106 after the predetermined period of time.

The dedicated monitoring systems 106 of FIG. 1 may include one or more UE monitoring systems 106(1), one or more air interface monitoring systems 106(2), one or more access network monitoring systems 106(3), and one or more core network monitoring systems 106(4), which may correspond to the respective, individual dedicated monitoring probes 104 shown in FIG. 1. For example, the UE monitoring system(s) 106(1) may be configured to obtain session logs 110 associated with UEs, as the UEs interact with the telecommunications network. Meanwhile, the air interface monitoring system(s) 106(2) may be configured to obtain session logs 110 associated with an air interface portion of the telecommunications network, the access network monitoring system(s) 106(3) may be configured to obtain session logs 110 associated with an access network portion(s) of the telecommunications network, and the core network monitoring system(s) 106(4) may be configured to obtain session logs 110 associated with a core network portion(s) of the telecommunications network, such as an IMS core.

A person having ordinary skill in the art will readily recognize that any suitable session monitoring system can be utilized for the dedicated monitoring systems 106 shown in FIG. 1. Although four dedicated monitoring system 106 are shown in FIG. 1 for obtaining session logs 110 from the respective portions of the telecommunications network, it is to be appreciated that the number of dedicated monitoring systems 106 shown in FIG. 1 is not limiting, as fewer or greater dedicated monitoring system 106 can be utilized.

The contextual data sources 108 may maintain contextual data 112 that is accessible to the TMAS 102 for use in troubleshooting a session degradation/failure. FIG. 1 illustrates the contextual data sources 108 as including, without limitation, one or more subscriber data management back end databases 108(1), one or more call detail record (CDR) databases 108(2), and one or more device/network characteristics databases 108(3). The subscriber data management back end database(s) 108(1) may include contextual data 112 in the form of subscriber data. Such subscriber data may include identifiers, such as, without limitation, IMSIs, International Mobile Equipment Identities (IMEIs), and MSISDNs. The subscriber data management back end database(s) 108(1) may maintain IMSIs and IMEIs in association with corresponding subscription identifiers, such as MSISDNs. In this manner, the TMAS 102 can obtain identifier data, such as an IMSI and/or an IMEI, from the database(s) 108(1) based on a MSISDN specified by an authorized user 114.

The CDR database(s) 108(2) may include contextual data 112 in the form of CDRs that are associated with corresponding communication sessions established over the telecommunications network. For example, the CDRs in the CDR database(s) 108(2) can include, without limitation, contextual data 112 specifying session start time, session end time, session termination reason code, session termination origination entity, the bandwidth (e.g., guaranteed bit rate (GBR)) reserved (or negotiated) for the communication session, a RAT type value, and a Quality of Service Class Indicator (QCI) value, among other contextual data 112.

The device/network characteristics database(s) 108(3) may include contextual data 112 in the form of a device data and network data. Device data maintained in the device/network characteristics database(s) 108(3) may include, without limitation, types of UE/devices (e.g., make and model of UEs), software versions/builds/identifiers of UEs, device capabilities, authorization status, registration status, notification records, and the like. The network data maintained in the device/network characteristics database(s) 108(3) may include, without limitation, radio frequency (RF) characteristics at corresponding geographical locations, RATs, Bands, coverage details of the telecommunications network, and the like.

FIG. 1 illustrates that an authorized user 114 can utilize a user device 116 to access the TMAS 102 for purposes of monitoring (and possibly analyzing) session logs 110 in order to troubleshoot degradation/failures in a telecommunications network. Because the contextual data sources 108 and the dedicated monitoring systems 106 may collect and maintain personal information related to the subscribers' call records, the TMAS 102 may enforce authentication procedures that are Customer Proprietary Network Information (CPNI) compliant. This ensures that users of the TMAS 102, such as the authorized user 114 of FIG. 1, are CPNI approved and certified users. Any suitable authentication procedure may be utilized to authenticate the authorized user 114, such as credential-based authentication procedures where the authorized user 114 provides access credentials that are verified by the TMAS 102 to be authentic before access is granted to the TMAS 102. Other biometric-based authentication procedures (e.g., fingerprint scanning, iris scanning, voice recognition, facial recognition, etc.) may be utilized in the alternative, and/or as augmentative authentication protocols, to the credential-based authentication. Other authentication procedures may be enforced on the device level as well, such as cryptographic, or key-exchanging techniques utilized between the user device 116 and the TMAS 102, in order to prevent unauthorized user devices from accessing the TMAS 102.

The user device 116 (sometimes referred to as a "user computing device 116," or a "user computer system 116") can be implemented as any suitable type of computing device configured to communicate with the TMAS 102, including, without limitation, a personal computer, desktop computer, a tablet computer, a laptop computer, a portable digital assistant (PDA), and/or any similar type of user device. The user device 116 may include at least a display for outputting information served by the TMAS 102 to the user device 116, such as user interfaces. Session logs 110 and/or reports 118 may also be displayed on the display of the user device 116 upon receipt from the TMAS 102. The user device 116 may also include a network interface(s) for sending/receiving data to/from the TMAS 102, such as over a computer network (e.g., the Internet).

The authorized user 114 may initially request access to the TMAS 102, such as by navigating a web-browser to a uniform resource locator (URL) associated with the TMAS 102, and/or opening and executing a client application on the user device 116. These types of access portals may be secured due to the sensitivity of the information/data accessible to the user 114 upon granting access to the TMAS 102. For example, the URL of the TMAS 102 may not be publicly available, may use https, and may only be available to particular users and devices that obtain access to a secure network (e.g., an intranet). The aforementioned authentication procedure (e.g., a CPNI-compliant authorization procedure) may also be enforced before access to the TMAS 102 is granted the authorized user 114 and the user device 116.

The TMAS 102 may request (e.g., via a user interface displayed on the user device 116) the authorized user 114 to specify an identifier (e.g., a MSISDN) associated with a subscription to services provided by an operator of the telecommunications network. This subscription identifier can be utilized by the TMAS 102 to initiate a log collection (and possibly a log analysis) process with respect to a subscription of interest. As will be described in more detail below, the user 114 may specify additional parameters for a given log collection and analysis query. The TMAS 102 may utilize the user-specified parameters to query one or more of the dedicated monitoring systems 106 shown in FIG. 1 to collect past session logs 110 associated with the user-specified subscription identifier. In response to such a query, the TMAS 102 may receive past session logs 110 from respective ones of the dedicated monitoring systems 106. For example, first past session logs 110 may be received from a first dedicated monitoring system 106, such as the core network monitoring system 106(4), second past session logs 110 may be received from a second dedicated monitoring system 106, such as the air interface monitoring system 106(2), and so on. These past session logs 110 may be sent to the user device 116, such as by downloading the past session logs 110 to a folder location on the user device 116 specified by the user 114. The TMAS 102 may also query one or more of the data sources 108 for contextual data 112. Contextual data 112 from the subscriber data management back end database(s) 108(1) may be utilized in the query (or queries) to the dedicated monitoring system(s) 106 so that past session logs 110 can be identified based on subscriber data, such as an IMSI and/or an IMEI. At least some of the contextual data 112 from the CDR database(s) 108(2) and/or the device/network characteristics database(s) 108(3) may be utilized in combination with the past session logs 110 to generate, without user intervention, a report 118 that includes session degradation/failure information. This report 118 may also be sent to the user device 116.

Figure 2:
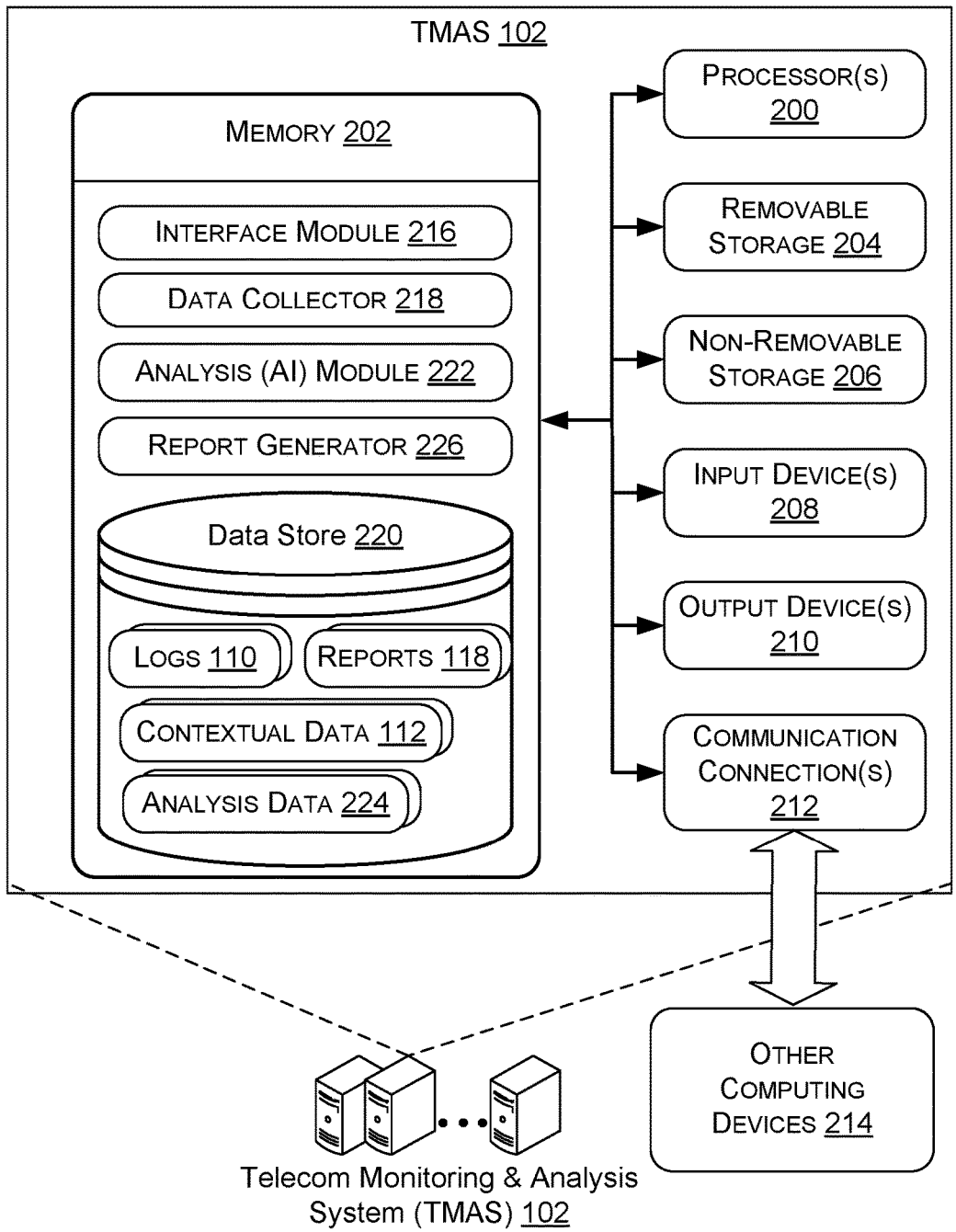
FIG. 2 is a block diagram of an example computing architecture of the TMAS in accordance with various embodiments.

FIG. 2 is a block diagram of an example computing architecture of the TMAS 102 in accordance with various embodiments. The TMAS 102 may represent the one or more computing devices, which may be implemented on a cloud infrastructure, and may be any type of computing device, including one or more server computers, perhaps arranged in a server farm, and/or representing a fleet of server computers. FIG. 2 shows the TMAS 102 as including one or more processors 200 and memory 202. In some configurations, the processor(s) 200 may include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof. Depending on the exact configuration and type of computing device employed by the TMAS 102, the memory 202 may include volatile (e.g., random access memory (RAM)), non-volatile (e.g., read only memory (ROM), flash memory, etc.), or some combination of the two.

The TMAS 102 can also include additional data storage devices (removable and/or non-removable) such as, for example, magnetic disks, optical disks, or tape. Such additional storage is illustrated in FIG. 2 by removable storage 204 and non-removable storage 206.

The TMAS 102 can also comprise input device(s) 208, such as a touch screen, keyboard, pointing devices (e.g., mouse, touch pad, joystick, etc.), pen, microphone, physical buttons, etc., through which a user can enter commands, information, and user input into the TMAS 102.

The TMAS 102 can further include one or more output devices 210 for providing output to a user of the TMAS 102. The output device(s) 210 can comprise, without limitation, a display, speakers, tactile feedback mechanisms, a printer, and so on.

The TMAS 102 can further include communication connections 212 (or communication interfaces 212) that allow the TMAS 102 to communicate with other computing devices 214, such as over a computer network, when the TMAS 102 is operated in a networked environment, such as over the Internet. The communication connections 212 are usable to, among other things, transmit/receive data over a network to/from the other computing devices 214, such as the devices/systems shown in the environment 100 of FIG. 1. Additionally, the communications connection(s) 212 can enable any suitable wired or wireless communications protocol that enables the TMAS 102 to interface with the other devices 214.

In various embodiments, the memory 202 comprises non-transitory computer-readable memory 202 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 202 may also be described as computer storage media and may include volatile and nonvolatile, removable and non-removable media implemented in any method or technology for storage of information, such as computer readable instructions, data structures, program modules, or other data. The memory 202, removable storage 204, and non-removable storage 206 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the processor(s) 200. In some configurations, any or all of the memory 202, removable storage 204, and non-removable storage 206 can store data, as well as modules, including programming instructions, data structures, program modules, and the like, which, when executed by the processor(s) 200, implement some or all of the processes described herein.

For example, the memory 202 may include an interface module 216 that is configured to interface with various systems/components shown in the environment 100 of FIG. 1 for purposes of implementing the techniques described herein. For example, the interface module 216 may allow the TMAS 102 to invoke one or more APIs to programmatically interface with the dedicated monitoring systems 106 when querying the dedicated monitoring systems 106 for past session logs 110. The interface module 216 may also allow the TMAS 102 to invoke one or more APIs to programmatically interface with the contextual data sources 108 when querying the data sources 108 for contextual data 112. The interface module 216 may also invoke one or more APIs to programmatically interface with the user device 116.

In addition, the interface module 216 may be configured to generate one or more interfaces for display on a display of the user device 116 accessing the TMAS 102. Interfacing with the user device 116 may include implementation of access control (e.g., CPNI compliant authentication procedures) and session management, as well as exposing command line interfaces and/or user interfaces (e.g., graphical user interfaces) that are configured to receive user-specified parameters for collecting and analyzing session logs for troubleshooting purposes, as described herein.

Figure 3:
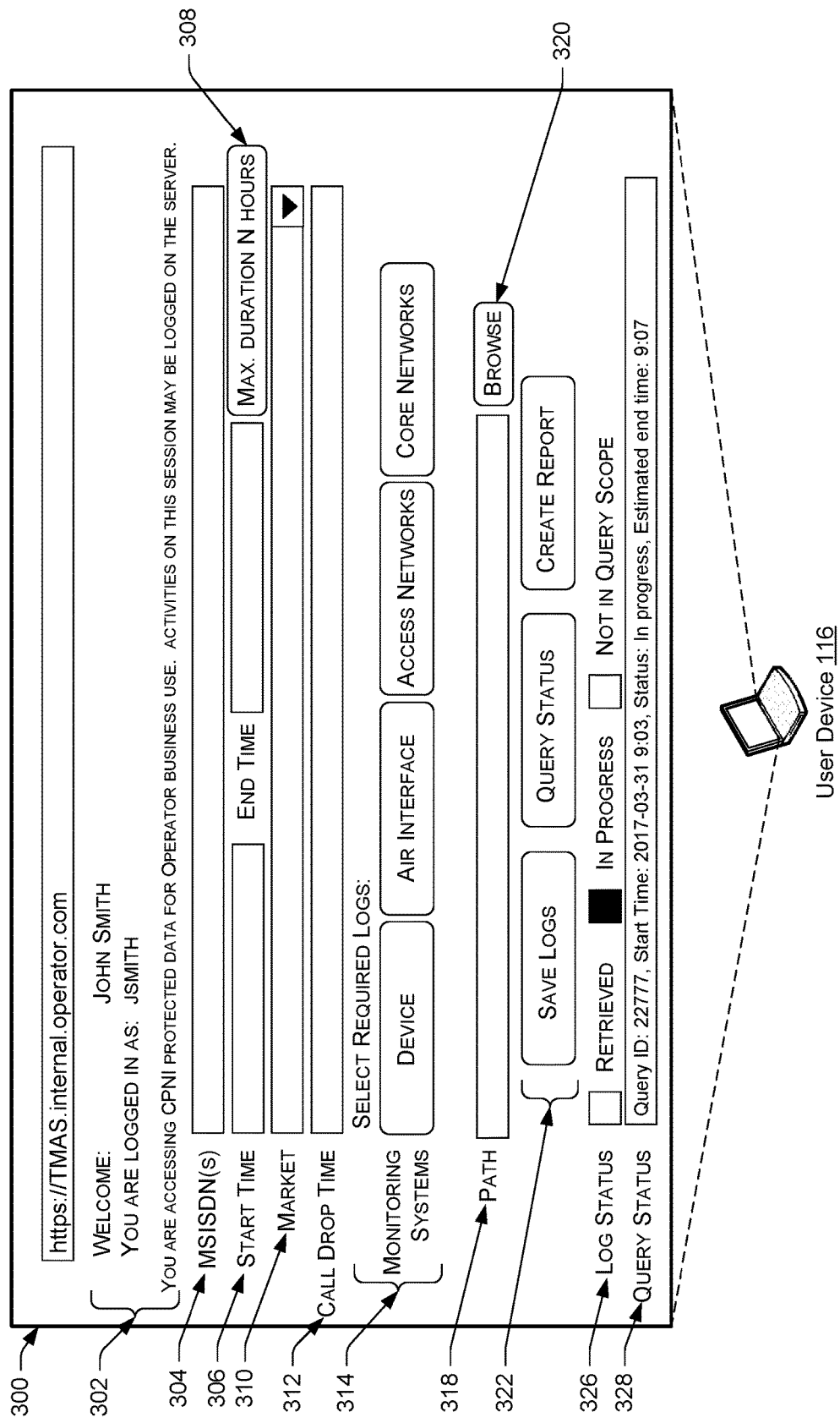
FIG. 3 illustrates an example user interface for an authorized user to request automated collection and analysis of session logs from the TMAS.

Turning briefly to FIG. 3, an example user interface 300 that may be served by the interface module 216 of the TMAS 102 to the user device 116 is illustrated. The user interface 300 may be presented on a display of the user device 116 in response to the user device 116 accessing the TMAS 102, and in response to authenticating the authorized user 114 and/or the user device 116. The authorized user 114 may enter parameters into particular regions of the user interface 300 as part of a request for automated collection and analysis of session logs 110 from the TMAS 102.

The user interface 300 shown in FIG. 3 may include login information 302 indicating that the user 114 has been authenticated, and is logged into the TMAS 102. The login information 302 may indicate a name and/or alias/username of the authenticated user 114, as shown in FIG. 3, as well as information notifying the user 114 about the sensitivity of the data he/she is requesting access to, as well as one or more conditions of using the TMAS 102 (e.g., the user's 114 activities may be logged).

The user interface 300 may further include a region 304 to specify (e.g., by entering into a text-entry field) one or more identifiers associated with one or more corresponding subscriptions to services provided by an operator of the telecommunications network. In the example user interface 300 of FIG. 3, the requested identifier comprises a subscription identifier in the form of a MSISDN, which, in the United States and Canada, is a ten digit number associated with a subscription (or an account) with a telecom operator (or carrier). The MSISDN allows the TMAS 102 to lookup subscriber data in the subscriber data management back end database(s) 108(1), such as an IMSI and/or an IMEI associated with the MSISDN(s) entered into the region 304.

The user interface 300 may further include a region 306 for the user 114 to specify a time window within which to collect past session logs 110 associated with the subscription identifier(s) entered into the region 304. The time window may be specified by the user 114 in terms of a start time and an end time, which represent lower and upper bounds, respectively, of times in the past when a session degradation/failure is suspected to have occurred. The authorized user 114 may obtain time information to enter into the region 306 from a third party complaint about an issue (e.g., a dropped call) experienced while using the telecommunications network. The authorized user 114 can specify any suitable length for the time window that allows for sufficient data (e.g., session logs 110, contextual data 112, etc.) to be collected regarding the communication session of interest. In some embodiments, in order to limit the size of the collected logs to a manageable size, the region 306 may include an indication 308 of a maximum allowed time window, and the user 114 may be unable to specify a time window that is larger than the maximum allowed time window. In some embodiments, the indication 308 may be a selectable element that automatically populates the end time when the user 114 specifies a start time and selects the selectable element 308, or that automatically populates the start time when the user 114 specifies an end time and selects the selectable element 308.

The user interface 300 may further include a region 310 for the user 114 to specify a market (e.g., a geographical area) so that the TMAS 102 can query for session logs 110 associated with one or more network nodes in the specified market. The region 310 for specifying the market may be implemented as a drop down menu where the user 114 can select one or more markets from a set of available markets associated with the telecommunications network.

The user interface 300 may further include a region 312 for the user 114 to specify a call drop time. This information may be gleaned from a third party complaint that indicated an estimated time when a call was dropped. The call drop time can be used by the AI module 222 to analyze the reason of the call/session drop.

The user interface 300 may further include a region 314 that includes a plurality of dedicated monitoring systems 106 available for selection via the user interface 300. For example, the user 114 may select the "Device" button shown in the region 314 in order to have the TMAS 102 query the UE monitoring system(s) 106(1) of FIG. 1. Likewise, the user 114 may select the "Air Interface" button shown in the region 314 in order to have the TMAS 102 query the air interface monitoring system(s) 106(2), the "Access Networks" button to have the TMAS 102 query the access network monitoring system(s) 106(3), and/or the "Core Networks" button to have the TMAS 102 query the core network monitoring system(s) 106(4). The region 314 may allow for selection of multiple monitoring systems 106 (e.g., some or all of the monitoring systems) in order to have the TMAS 102 query multiple ones of the available monitoring system 106 in parallel. Selecting all of the dedicated monitoring systems 106 in the region 314 may cause the TMAS 102 to collect session logs 110 across the entire telecommunications network, thereby providing an "end-to-end" view of the session logs 110 associated with a communication session.

The user interface 300 may further include a region 318 where the user 114 can specify a local or remote "path" and/or an electronic mail (email) address(es) (or a folder location on the user device 116) where session logs 110 and/or an automatically-generated report 118 are to be saved/downloaded. The region 318 may include a "browse" button 320 that, when selected, allows the user 114 to select a folder location among multiple available folder locations on the user device 116 where data is to be downloaded.

The user interface 300 may further include a region 322 for the user 114 to specify whether he/she would like the TMAS 102 to "Save Logs" (i.e., have the TMAS 102 save the past session logs 110 to the user device 116, at the folder location specified in the region 318, and/or send the logs 110 to a recipient(s), such as to an email address(es)), "Create Report" (i.e., have the TMAS 102 generate a report 118 and save the report 118 to the user device 116, at the folder location specified in the region 318), and/or "Query Status" (i.e., have the TMAS 102 provide a current query status after the query has been submitted). Selection of individual ones of these options in region 322 may cause a request to be submitted for collecting logs, querying status, and/or creating a report, which may cause the TMAS 102 to query the dedicated monitoring system(s) 106 specified (e.g., selected) by the user 114 in the region 314 to receive the session logs 110 obtained by those monitoring systems 106.

The user interface 300 may further include a region 326 showing a current status of a request to collect and analyze session logs 110 by the TMAS 102. FIG. 3 shows an example where a submitted request is "In Progress" (i.e., not yet completed).

The user interface 300 may further include a region 328 that provides further details about the query status. FIG. 3 shows an example where a query identifier (ID) is shown in the region 328, along with the start time, the status (e.g., "In Progress"), and an estimated end time of the request.

Figure 4:
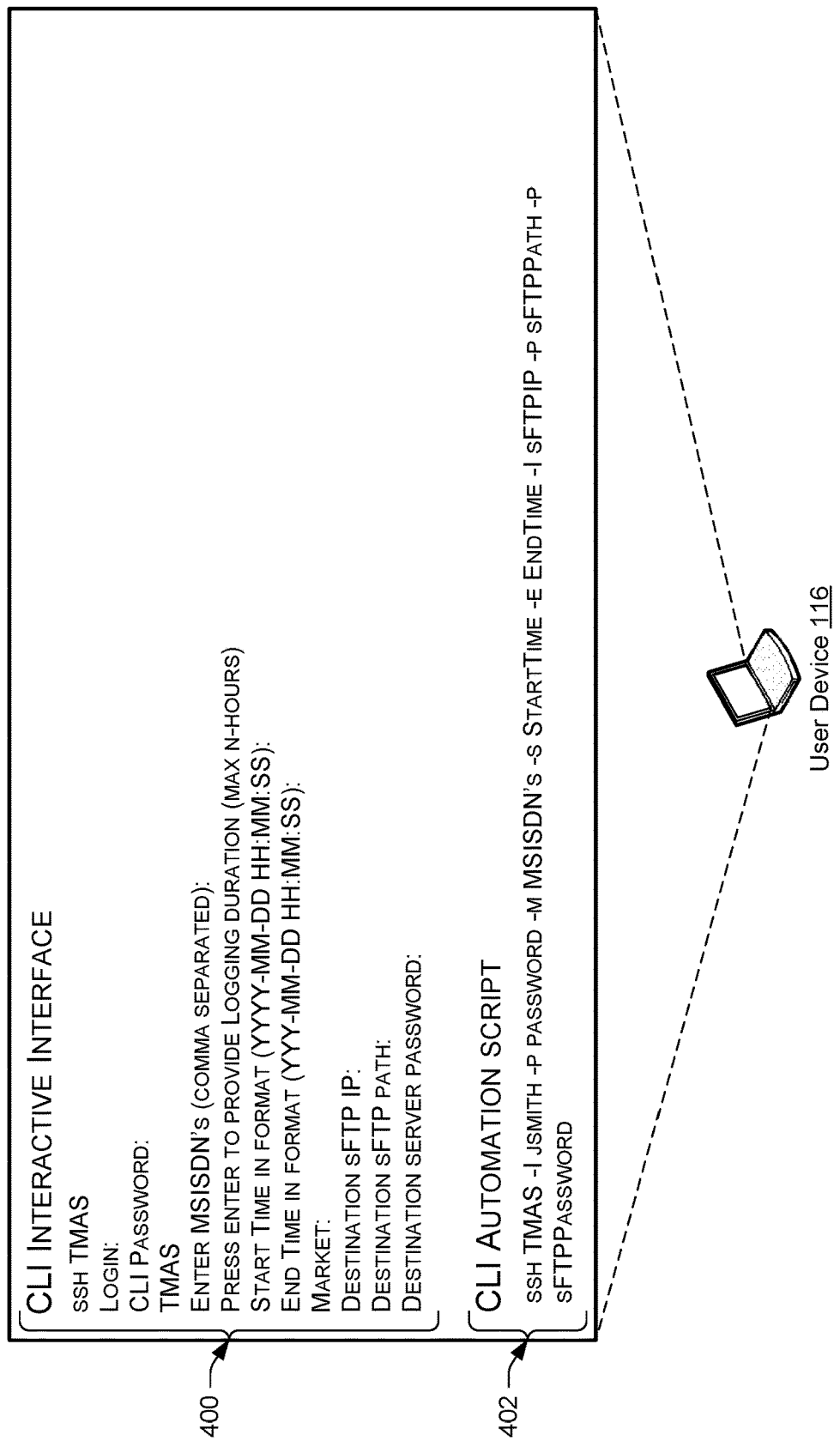
FIG. 4 illustrates an example command line interface and a command line interface automation script for use in automated collection and analysis of session logs from the TMAS.

Turning briefly to FIG. 4, an example command line interface (CLI) 400 that may be served by the interface module 216 of the TMAS 102 is shown. Also shown in FIG. 4 is an automation script 402 that may be specified by the user 114. Upon execution of the automation script 402 by the TMAS 102, session logs 110 may be automatically collected (and possibly analyzed) by the TMAS 102. The CLI 400 and automation script 402 may provide alternative mechanisms for the user 114 to interface with the TMAS 102 in order to request the collection (and possibly analysis) of session logs 110 for troubleshooting purposes. The CLI 400 and the automation script 402 may be presented on a display of the user device 116 in response to the user device 116 accessing the TMAS 102. The authorized user 114 may enter parameters into the CLI 400 as part of a request for automated collection and analysis of session logs 110 from the TMAS 102. Many of the parameters in the CLI 400 correspond to the user-specifiable parameters that were described with reference to the user interface 300 of FIG. 3, and will not be described again here. The CLI 400 may further include lines to enter credentials for authenticating the authorized user 114, and for authenticating the use of a destination path where session logs 110 and/or reports 118 are to be save/downloaded.

Returning to FIG. 2, the memory 202 may further include a data collector 218 that is configured to receive data, such as the session logs 110 and the contextual data 112, via queries issued via the interface module 216 to other systems/components/data sources in the environment 100 of FIG. 1, and to store the data in a data store 220. In some embodiments, the data collector 218 may be further configured to identify formats of various types of data collected, and may manipulate the data having the same format, such as by merging session logs 110 having a same format to arrange a subset of collected session logs 110 that have a same format into chronological order for easier consumption at the user device 116. For example, the session logs 110 may have different formats, such as, without limitation, packet capture (pcap) format, JavaScript Object Notification (JSON) format, txt format, and so on. In some embodiments, the data collector 218 may merge session logs 110 having the same format for logs 110 that are received from a single dedicated monitoring system 106 and/or logs 110 received from multiple, different dedicated monitoring systems 106. Thus, the data collector 218 can correlate first past session logs 110 received from a first dedicated monitoring system 106(1) can be correlated with second past session logs 110 received from a second dedicated monitoring system 106(2), such as by identifying logs 110 having the same format and arranging the logs 110 having the same format in chronological order.

The memory 202 may further include an analysis module 222 (sometimes referred to as an "artificial intelligence (AI) module 222") that is configured to analyze collected session logs 110 and/or contextual data 112 using various techniques, including AI and/or machine learning techniques. As a result of the analysis module 222 analyzing the data collected by the data collector 218, the analysis module 222 may generate analysis data 224, which can also be maintained in the data store 220.

In some embodiments, expert users may examine at least some of the past session logs 110 collected by the TMAS 102, such as during a troubleshooting process to identify root causes of session degradations and/or session failures within the telecommunications network, as exhibited in the examined past session logs 110. These expert users can provide feedback to the TMAS 102, which can be stored as the analysis data 224. As such, the analysis data 224 can pertain to data that associates root causes of session degradations/failures with the session logs 110. This type of analysis data 224 can be used as training data to train the AI module 222, such as when the AI module 222 is implemented as a machine learning model.

Machine learning generally involves processing a set of examples (called "training data") in order to train a machine learning model(s). A machine learning model, once trained, is a learned mechanism that can receive new data as input and estimate or predict a result as output, sometimes with a pre-calculated confidence. For example, a trained machine learning model can comprise a classifier that is tasked with localizing the cause of a call drop, and it would, for example, determine whether the calls drop was triggered by the UE when it was trying to perform a handover at a poor coverage area, or whether the call drop was triggered by the other party who might be served by another service operator. In the context of the present disclosure, the unknown input may include newly collected past session logs 110, among other input, and the machine learning model(s) utilized by the AI module 222 may be tasked with classifying the unknown input as one of multiple class labels. The class labels, in this case, can correspond to root causes of session degradations and/or session failures within the telecommunications network. In this manner, the AI module 222 can learn, over time, how to process data collected by the data collector 218 in order to inspect and correlate session logs 110 received from various dedicated monitoring systems 106 in order to localize an issue by determining a root cause(s) of the session degradation/failure. In some embodiments, the AI module 222 can perform deep packet inspection before a drop time of a communication session that was dropped.

The output from the AI module 222 may feed into a report generator 226 to generate advanced reports 118. To implement machine learning, the AI module 222 may utilize a single machine learning model or an ensemble of base-level machine learning models, and may utilize any type of machine learning model. Suitable machine learning models for use with the techniques and systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The report generator 226 may automatically generate, without user intervention, reports 118 that include session degradation/failure information with respect to a particular subscription or communication session associated with the telecommunications network. The reports 118 can be generated from the analysis module's 222 analysis of the session logs 110 and/or the contextual data 112, and therefore, the reports 118 may be generated based at least in part on the past session logs 110 and/or the contextual data 112 collected by the data collector 218.

As an example, the report generator 226 can generate a relatively basic report 118 that includes subscriber data (e.g., an IMSI), device characteristics, such as the type of UE, the version/build/type of software executing on the UE, and the like, as well as session failure information including, without limitation, a drop time of a communication session (e.g., a call) that was dropped, a drop cause code of the communication session that was dropped, one or more RF characteristics at a geographical location where the communication session was dropped, and/or similar session failure information. At least some of the data/information included in the report can be obtained, or derived, from the contextual data 112 collected from the data sources 108.

As another example, the report generator 226 can generate more advanced reports 118 by leveraging the analysis module 222. This may allow the TMAS 102 to send reports 118 to the user device 116 that detail, more precisely, what happened prior to a session failure (e.g., a dropped call), and may allow for "expert-level" session failure analysis using advanced AI and/or machine learning techniques, as described herein. Over time, as more and more analysis data 224 is generated, such as feedback from human experts regarding root causes of session degradations/failures, the AI module 222 can learn how to analyze session logs 110 in view of contextual data 112, just as, or better than, a human expert would, and may eventually provide sophisticated report 118 generation that can alleviate much of the tedium involved in manual troubleshooting of session degradations/failures.

Figure 5:
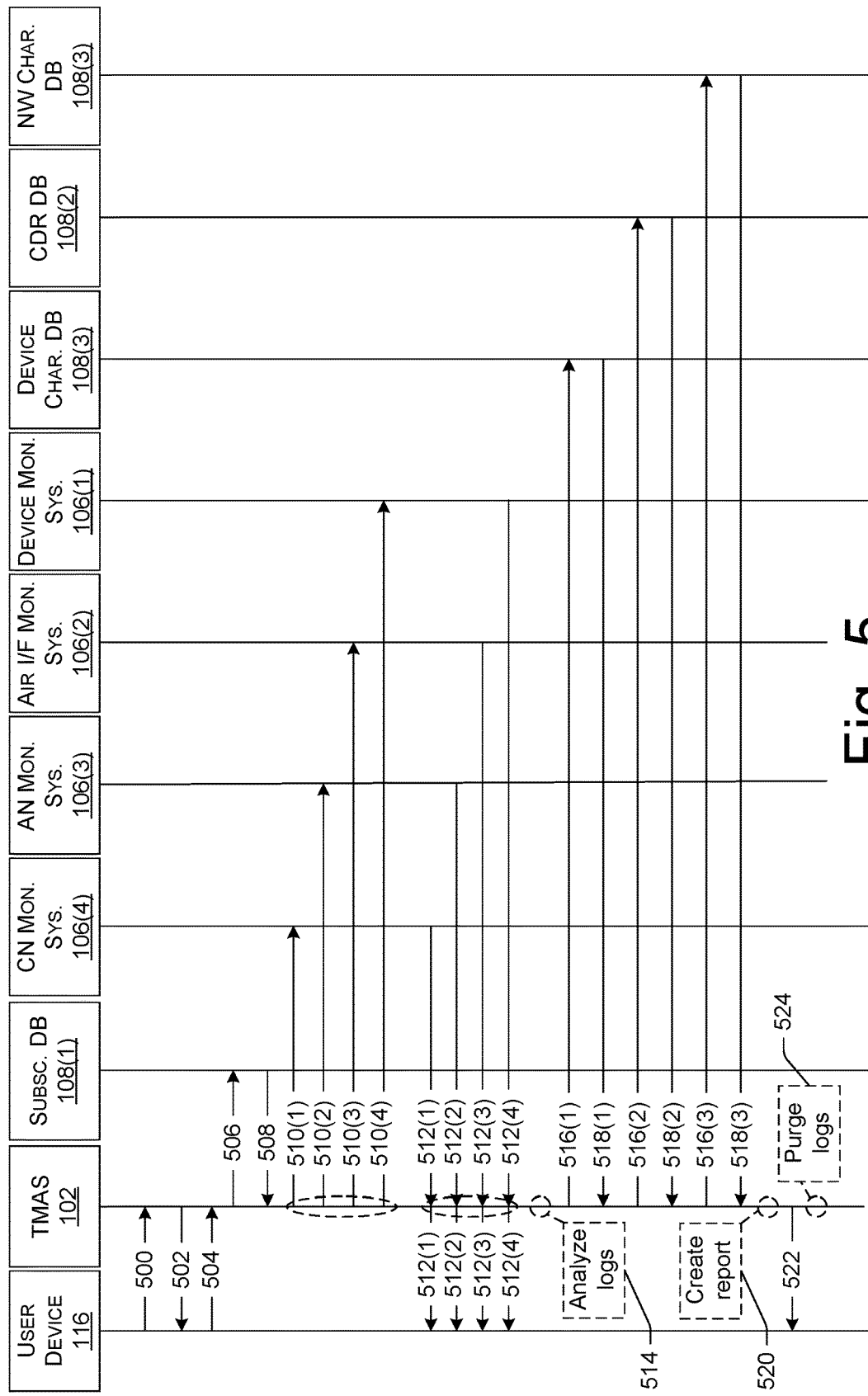
FIG. 5 illustrates an example signaling sequence diagram between the TMAS and various components of the environment of FIG. 1.

FIG. 5 illustrates an example signaling sequence between the TMAS 102 and various components of the environment 100 introduced in FIG. 1. As such, the signaling sequence shown and described with reference to FIG. 5 can be considered a process, as described in terms of this disclosure. The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

As shown in FIG. 5, the signaling sequence may begin with a request 500 that is received at the TMAS 102 from a user device 116. The request 500 may comprise a request 500 to access the TMAS 102 for purposes of monitoring session degradations and/or session failures in a telecommunications network. The request 500 may trigger a login procedure, which may include an authentication procedure that is CPNI-compliant due to the sensitive personal information that the TMAS 102 has access to. The authentication procedure may include a whitelist-based authentication procedure, or any similar authentication procedure as described herein.

Upon successfully granting the user device 116 and/or an authorized user 114 of the user device 116 access to the TMAS 102, the TMAS 102 may send a request 502 requesting the authorized user 114 of the user device 116 to specify one or more parameters for a query for past session logs 110. The parameters requested in the request 502 may include identifiers (e.g., a subscription identifier in the form of a MSISDN) associated with a subscription to services provided by an operator of the telecommunications network. The parameters may further include any of the additional parameters described herein, such as a time window within which to collect the past session logs 110 associated with the subscription identifier, as well as the particular dedicated monitoring systems 106 from which the user 114 would like session logs 110 collected. This request 502 may be served to the user device 116 in the form of a user interface, such as the user interface 300 of FIG. 3, displayed on a display of the user device 116 that includes a region 304 for the user 114 to specify the identifier. Alternatively, the request 502 may be served to the user device 116 in the form of the CLI 400 and/or the automation script 402 interface shown in FIG. 4.

The user 114 may specify the requested parameters 504 (e.g., subscription identifier(s), time window, monitoring systems 106, destination folder, a session drop time, etc.), which are sent to the TMAS 102. The user 114 may specify the requested parameters 504 via the user interface 300, the CLI 400, or the automation script 402. The TMAS 102 may create a query identifier (ID) in response to receiving a request to submit a query (e.g., by selecting the selectable element 324 in the user interface 300 of FIG. 3).

The signaling sequence of FIG. 5 continues by the TMAS 102 a querying the subscriber data management back end database(s) 108(1) using the subscription identifier(s) 506 (e.g., a MSISDN) specified by the user 114. In response, TMAS 102 may receive subscriber data 508, such as an IMSI(s) and/or an EMEI(s) associated with the subscription identifier(s) 506.

The TMAS 102 may then utilize the subscriber data 508 to query 510 one or multiple dedicated monitoring systems 106 for past session logs 110 associated with the subscription identifier 506 (by virtue of the subscription data 508 associated with the subscription identifier 506). For example, if the user 114 selected all of the available dedicated monitoring systems 106, the TMAS 102 may invoke an API to query 510(1) the core network monitoring system(s) 106(4), an API to query 510(2) the access network monitoring system(s) 106(3), an API to query 510(3) the air interface monitoring system(s) 106(2), and an API to query 510(4) the device monitoring system(s) 106(1). If the user 114 selected a subset of the available dedicated monitoring systems 106, queries 510 may be issued to those particular monitoring systems 106.

In response to the queries 510, the TMAS 102 may receive, from the queried dedicated monitoring systems 106, past session logs 512 (also "past session logs 110") associated with the parameters 504 included in the queries 510, as specified by the user 114. These past session logs 512 may be sent to the user device 116, such as by saving/downloading the past session logs 512 to a user-specified destination folder on the user device 116.

The TMAS 102, using the analysis module 222, may analyze 514 the past session logs 512, as described herein. For example, session logs 512 having a same format can be identified and arranged in chronological order. This can be done before sending the past session logs 512 to the user device 116. As another example, the past session logs 512 can be processed through a trained machine learning model to output detailed analysis results, such as a root cause of a session degradation/failure of a communication session (e.g., a dropped call). The analysis 514 may also involve extracting information from the past session logs 512 for use in querying the data sources 108. For example, identifiers, timestamps, and the like, may be used to query various data sources 108 for contextual data 112.

The signaling sequence may continue by the TMAS 102 invoking an API to query 516(1) the device/network characteristics database(s) 108(3) for contextual data 112 in the form of device data. This device data 518(1) can be received by the TMAS 102 in response to the query 516(1), and may include, without limitation, a type of device (e.g., make and/or model of a UE), a software version/build/identifier of the UE, authorization status, notification records, and/or any similar contextual device data 518(1) that can provide added context to the past session logs 512.

The TMAS 102 may also invoke an API to query 516(2) the CDR database(s) 108(2) for contextual data 112 in the form of CDRs associated with the subscription identifier. In response to the query 516(2), the TMAS 102 may receive CDRs 518(2) from the CDR database(s) 108(2).

The TMAS 102 may also invoke an API to query 516(3) the device/network characteristics database(s) 108(3) for contextual data 112 in the form of network data. In response to the query 516(3), the TMAS 102 may receive network data 518(3), which may include, without limitation, one or more RF characteristics at one or more geographical locations/markets of the telecommunications network.

At 520, the TMAS 102 may create a report 118, as described herein. The report may include session degradation/failure information, such as a time a communication session was dropped, a drop cause code of a dropped communication session, one or more RF characteristics in a geographical location where the communication session was dropped, and/or other session degradation/failure information. More advanced reports that localize a root cause of a session degradation/failure in the telecommunications network may be included in the report 520 based on the analysis module 222 output (e.g., using AI and/or machine learning techniques). The report 118 created at 520 may be based at least in part on the past session logs 512 and/or the contextual data 112 (e.g., 518(1)-(3)) received by the TMAS 102.

At 522, the TMAS 102 may send the report 118 to the user device 116, such as by saving/downloading the report 118 to a user-specified destination folder on the user device 116. At 524, the TMAS 102 may purge session logs 110 from the data store 220, such as after a period of time (e.g., a threshold age of the logs 110, as measured by timestamp data).

Figure 6:
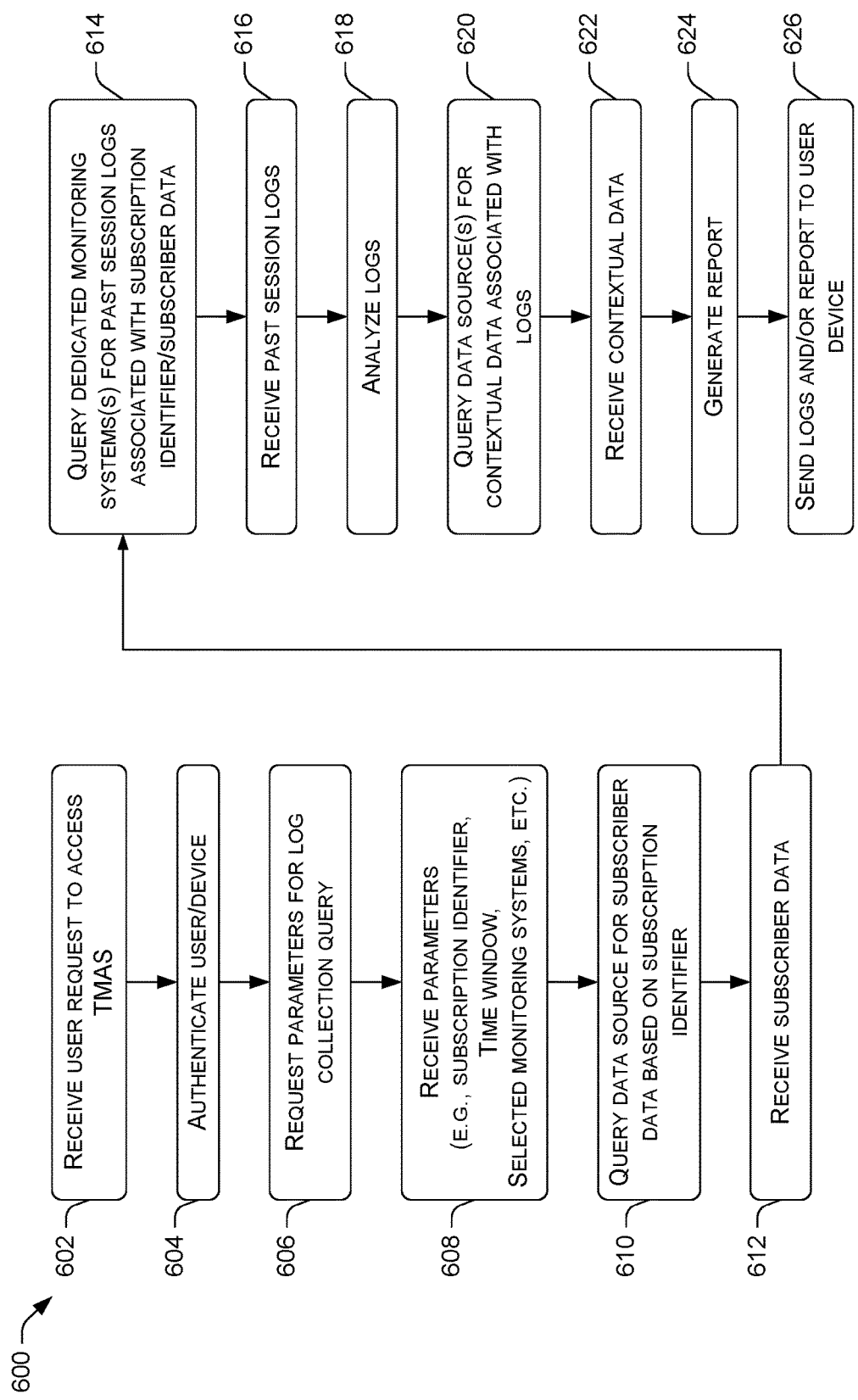
FIG. 6 illustrates a flowchart of an example process for automatically collecting past session logs from one or more dedicated monitoring systems, analyzing the logs with contextual data, generating a report, and sending the logs and/or report to a user device.

FIG. 6 illustrates a flowchart of an example process 600 for automatically collecting past session logs 110 from one or more dedicated monitoring systems 106, analyzing the logs 110 with contextual data 112, generating a report 118, and sending the logs 110 and/or report 118 to a user device 116. The process 600 may be implemented by the TMAS 102, as described herein.

At 602, the TMAS 102 may receive a request 500 from a user device 116 to access a system 102 for monitoring session degradations and/or session failures in a telecommunications network.

At 604, the TMAS 102 may authenticate the user 114 and/or the user device 116. For example, the user 114 may be authenticated using a credential-based, CPNI-compliant authentication process, or any similar process, as described herein. Upon authentication at block 604, the authorized user 114 may gain access to the TMAS 102 via the user device 116.

At 606, the TMAS 102, via the interface module 216, may request 502 the user 114 of the user device 116 to specify parameters for a log collection query. The parameters requested at block 606 can include any of the parameters described herein, such as, without limitation, an identifier (e.g., a MSISDN) associated with a subscription to services provided by an operator of the telecommunications network, a time window for collecting past logs 110 within the time window, and/or selected ones of available dedicated monitoring systems 106 from which to obtain past session logs 110. As described herein, the request 502 for parameters may be provided to the user device 116 in a variety of ways, such as by requesting the user 114 to specify an automation script 402 with at least some of the requested parameters, or providing a CLI 400, or a user interface 300, as described herein.

At 608, the TMAS 102, via the interface module 216, may receive one or more user-specified parameters from the user device 116 for use in submitting a query for past session logs 110. The parameters received at block 608 may include the requested subscription identifier, a time window within which to collect the past session logs 110 associated with the subscription identifier, a selection of one or multiple dedicated monitoring systems 106 among a plurality of dedicated monitoring systems 106 accessible to the TMAS 102. For example, the parameters received at block 608 may include one, two, three, or all of the four dedicated monitoring systems 106 shown in FIG. 1.

At 610, the TMAS 102 may query the subscriber data management back end database(s) 108(1) for subscriber data (e.g., an IMSI and/or IMEI) associated with the subscription identifier included in the parameters received at block 608. At 612, the TMAS 102 may receive the subscriber data, such as the IMSI and/or EMEI, from the subscriber data management backend database(s) 108(1).

At 614, the TMAS 102 may invoke one or more APIs to query one or multiple dedicated monitoring systems 106 for past session logs 110, according to the parameters received at block 608 and/or the subscriber data received at block 612. For example, if the parameters received at block 608 indicate that the user 114 selected two of the available dedicated monitoring systems 106, the TMAS 102 may invoke a first API to query a first dedicated monitoring system 106(1), and a second API to query a second dedicated monitoring system 106(2). The querying at block 614 may, in some embodiments, include executing an automation script, such as the automation script 402 shown in FIG. 4.

At 616, the TMAS 102 may receive past session logs 110 from the queried dedicated monitoring systems 106, the past session logs 110 being associated with the parameters received at block 608 and/or with the subscriber data received at block 612, such as session logs 110 within a user-specified time window, session logs 110 associated with a user-specified geographical region/market associated with the telecommunications network, among other parameters. When multiple dedicated monitoring systems 106 are queried at block 614, the past session logs 110 received at block 616 may include first past session logs 110 from a first dedicated monitoring system 106, second past session logs 110 from a second dedicated monitoring system 106, and so on, for any number of the available dedicated monitoring systems 106 associated with different portions of the telecommunications network.

At 618, the logs 110 may be analyzed by the analysis module 222, as described herein. This may involve data extraction from the logs 110 that is used to query other data sources, and/or manipulation (e.g., organization) of the logs based on timestamp data, identifier data, or any other available data.

At 620, the TMAS 102 may query one or more data sources 108 for contextual data 112 associated with the past session logs 110. The query at block 620 may be based on the results of the analysis at block 618, and/or based on the parameters received at block 608, and/or based on the subscriber data received at block 612.

At 622, the TMAS 102 may receive, from the queried data sources 108, the contextual data 112 associated with the past session logs 110. The contextual data 112, as described herein, may provide added context to the past session logs 110 that facilitates a troubleshooting process to identify causes of session degradations/failures.

At 624, the TMAS 102, via the report generator 226, may generate, without user intervention, and based at least in part on the past session logs 110 received at block 616, a report 118 that includes session degradation information or session failure information. The report generation at block 624 may also be based at least in part on the contextual data 112 received at block 622. In some embodiments, the report 118 comprises a basic report with information/data such as the subscriber data received at block 612, and/or device data received from one or more of the data sources 108 at block 622. In some embodiments, the session failure information in the report 118 includes a drop time of a communication session (e.g., a call) was dropped, and/or a drop cause code of the communication session that was dropped, and/or one or more RF characteristics at a geographical location where the communication session was dropped.

At 626, the logs 110 (perhaps after manipulation/organization based on the analysis at block 618) and/or the report 118 generated at block 624 may be sent to the user device 116. This may comprise downloading and saving the past session logs 110 and/or the report 118 to a folder location on the user device 116 specified by the user 114.

Figure 7A:
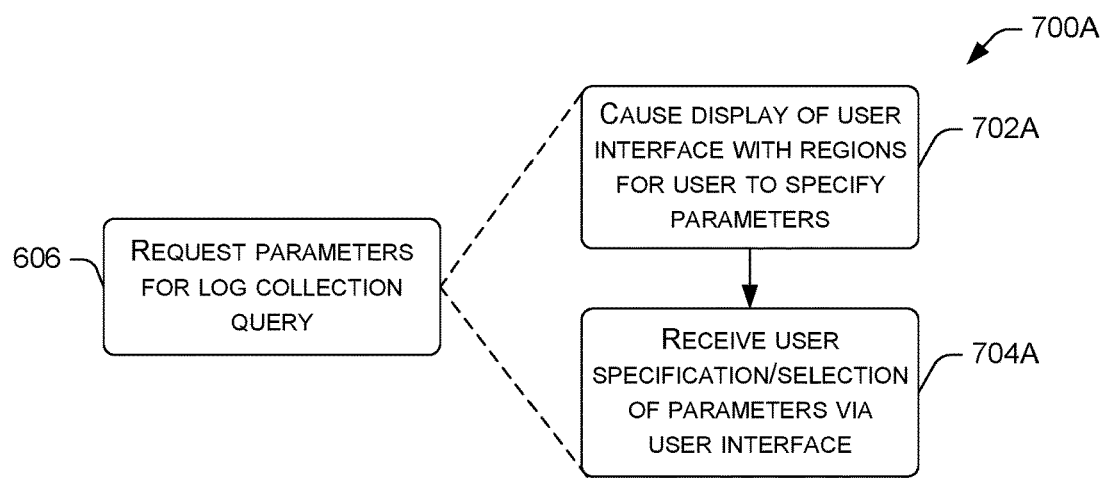
FIG. 7A illustrates a flowchart of an example process for requesting parameters for a log collection query using a user interface.

FIG. 7A illustrates a flowchart of an example process 700A for requesting parameters for a log collection query using a user interface. The process 700A may represent a more detailed sub-process for block 606 of the process 600 shown in FIG. 6.

At 702A, the TMAS 102, via the interface module 216, may cause a user interface 300 to be displayed on a display of the user device 116. The user interface 300 may be configured to receive, via user input to the user device 116, one or more parameters for a log collection query, such as the parameters illustrated by the user interface 300 of FIG. 3. For example, the user interface 300 include a region 304 to receive an identifier(s) (e.g., a MSISDN(s)) associated with a subscription(s) to services provided by an operator of the telecommunications network, as well as a region 306 for the user 114 to specify a time window within which to collect past session logs 110 associated with the subscription identifier(s), and/or a region 314 for receiving a selection of at least one dedicated monitoring system 106 among a plurality of dedicated monitoring systems 106 available for selection via the user interface 300, among other parameters described herein.

At 704A, the TMAS 102, may receive, via the user interface 300 displayed at block 702A, one or more parameters requested via the user interface 300. For example, the user 114 may specify a subscription identifier(s), the time window, and/or a selection of the one or multiple dedicated monitoring systems 106 among the plurality of dedicated monitoring systems 106 available for selection. In this manner, the user 114 is able to utilize the TMAS 102 to query multiple disparate monitoring systems 106 associated with different portions of the telecommunications network using a single user interface.

Figure 7B:
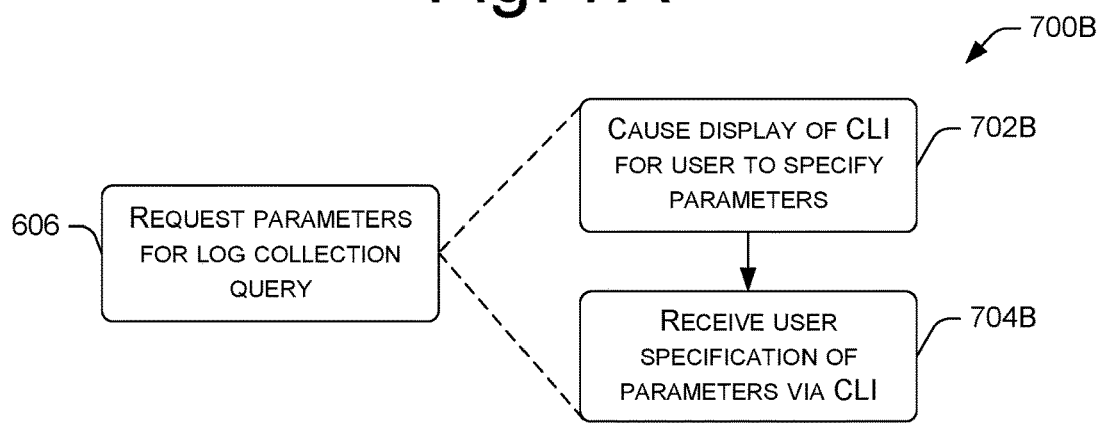
FIG. 7B illustrates a flowchart of an example process for requesting parameters for a log collection query using a command line interface.

FIG. 7B illustrates a flowchart of an example process 700B for requesting parameters for a log collection query using a command line interface (CLI) 400. The process 700B may represent another example of a more detailed sub-process for block 606 of the process 600 shown in FIG. 6.

At 702B, the TMAS 102, via the interface module 216, may cause a command line interface (CLI) 400 to be displayed on a display of the user device 116. The CLI 400 may be utilized, by the authorized user 114 to specify one or more parameters for a log collection query. The parameters may be similar to those described with reference to the process 700A, and elsewhere herein, expect that the interface is different.

At 704B, the TMAS 102, may receive, via the CLI 400 displayed at block 702B, one or more parameters requested via the CLI 400. This illustrates another manner in which the user 114 is able to utilize the TMAS 102 to query multiple disparate monitoring systems 106 associated with different portions of the telecommunications network using a single CLI 400.

Figure 8:
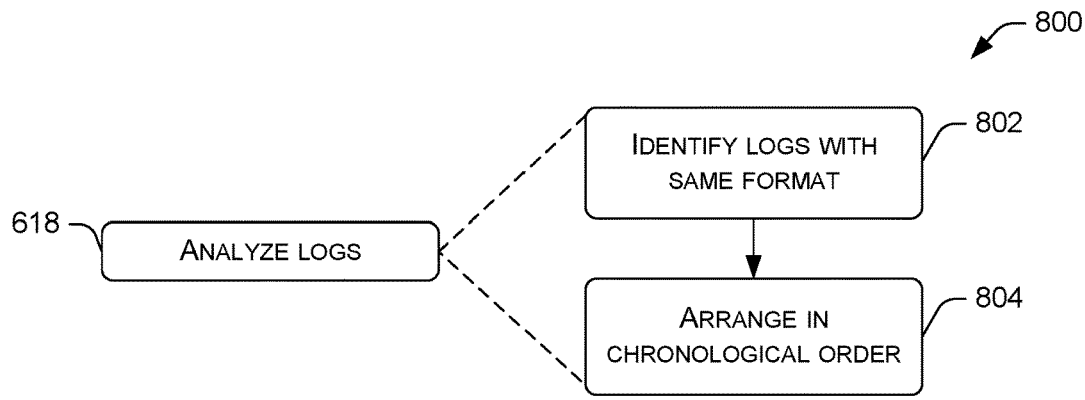
FIG. 8 illustrates a flowchart of an example process for arranging session logs having a same format.

FIG. 8 illustrates a flowchart of an example process 800 for arranging session logs 110 having a same format. The process 800 may represent a more detailed sub-process for block 618 of the process 600 shown in FIG. 6.

At 802, the TMAS 102, via the analysis module 222, may identify a subset of past session logs 110 among the past session logs 110 received at block 616 having a same format. For example, a subset of session logs 110 having a JSON format, or any other format, can be identified at block 802.

At 804, the TMAS 102 may arrange the subset of past session logs 110 having the same format in chronological order based at least in part on respective timestamps identified in the subset of past session logs 110. For example, the session logs 110 may include timestamps indicating a time when data packets were generated, received, transmitted, relayed, and/or routed via a node of the telecommunications network, and this timestamp information may be utilized to arrange session logs 110 having a same format in chronological order. This may allow for correlation of session logs 110 received from different ones of the dedicated monitoring systems 106, or merely organizing session logs 110 obtained from a single monitoring system 106 based on time.

Figure 9:
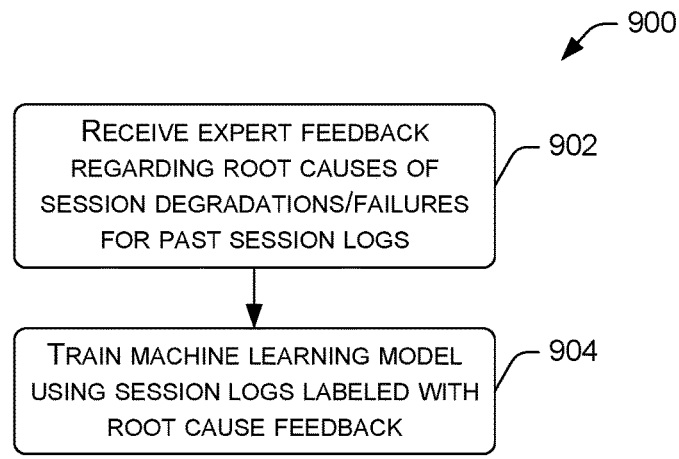
FIG. 9 illustrates a flowchart of an example process for training a machine learning model to predict a root cause of a session degradation/failure in a telecommunications network.

FIG. 9 illustrates a flowchart of an example process 900 for training a machine learning model to predict a root cause of a session degradation/failure in a telecommunications network. The process 900 may be implemented by the TMAS 102 via the AI module 222.

At 902, the TMAS 102, after collecting past session logs 110 and storing the logs 110 in the data store 220, may receive feedback from one or more expert users that analyze the past session logs 110. The expert feedback may include data/information regarding root causes, within the telecommunications network, of session degradations or session failures exhibited in the past session logs 110 analyzed by the experts. For example, root causes may be identified as a particular issue with a particular node of the telecommunications network that is causing session degradations/failures. Such root causes may include faulty/buggy software installed on UEs, faulty hardware/software of a node within the core network, or any similar root cause that may be identified by an expert upon examining session logs 110. This expert feedback data may be maintained as the analysis data 224 in the data store 220 in association with the past session logs 110.

At 904, the AI module 222 may train a machine learning model using training data to obtain a trained machine learning model. The training data may include the past session logs 110 that were analyzed by the expert users, and the data regarding the root causes in the expert feedback received at block 902. That is, the past session logs 110 can be labeled with root causes determined by expert users and leveraged as training data to train a machine learning model, as described herein. An example use of such a machine learning model is described herein, such as with reference to the following FIG. 10.

Figure 10:
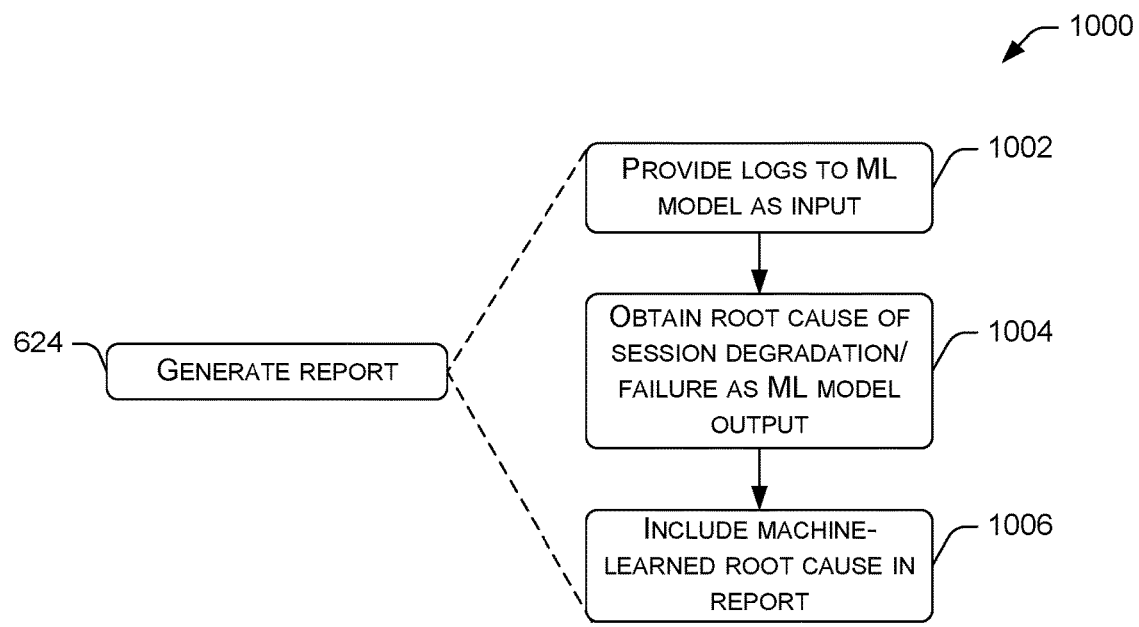
FIG. 10 illustrates a flowchart of an example process for automatically generating a report for troubleshooting session degradation/failures using machine learning.

FIG. 10 illustrates a flowchart of an example process 1000 for automatically generating a report 118 for troubleshooting session degradation/failures using machine learning. The process 1000 may represent a more detailed sub-process for block 624 of the process 600 shown in FIG. 6.

At 1002, the AI module 222 may provide past session logs 110 (such as the past session logs 110 that were received at block 616 of the process 600) as input to the trained machine learning model.

At 1004, the trained machine learning model may generate, and the AI module 222 may obtain, output in the form of a root cause, within the telecommunications network, of a session degradation or a session failure.

At 1006, the report generator 226 may include the root cause in the session degradation information or the session failure information of a report 118 generated at block 624 of the process 600. Thus, more advanced reports 118 can be generated over time as past session logs 110 are analyzed to train AI systems using machine learning algorithms.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
   receiving a request from a user computing device to access a system for monitoring at least one of a session degradation or a session failure of a communication session between subscribers in a telecommunications network;
   causing, by the system, a user interface to be displayed on a display of the user computing device, the user interface being configured to receive, via user input to the user computing device:
      an identifier associated with a subscription to services provided by an operator of the telecommunications network;
      a time window within which to collect past session logs associated with the identifier; and
      a selection of at least two dedicated monitoring systems among a plurality of dedicated monitoring systems available for selection via the user interface, the plurality of dedicated monitoring systems monitoring the communication session within respective portions of the telecommunications network, individual dedicated monitoring systems of the plurality of dedicated monitoring systems being configured to obtain session logs comprising information relating to data packets of the communication session captured by a corresponding dedicated monitoring probe within the respective portion of the telecommunications network for the individual dedicated monitoring systems;
   receiving, via the user interface, the identifier, the time window, and the selection of the at least two dedicated monitoring systems;
   querying, by the system, the at least two dedicated monitoring systems for the past session logs associated with the identifier;
   receiving the past session logs from the at least two dedicated monitoring systems;
   sending the past session logs to the user computing device; and
   generating, using a trained machine learning model, a root cause within the telecommunications network of the at least one of the session degradation or the session failure of the communication session by processing the past session logs as input to the trained machine learning model and by performing deep packet inspection before the at least one of the session degradation or the session failure, wherein the trained machine learning model uses training data including additional past session logs and data regarding root causes of session degradations or session failures exhibited in the additional past session logs.

2. The method of claim 1, wherein:
   receiving the selection of the at least two dedicated monitoring systems comprises receiving, via the user interface, a selection of multiple dedicated monitoring systems comprising a first dedicated monitoring system and a second dedicated monitoring system;
   querying the at least two dedicated monitoring systems comprises:
      querying the first dedicated monitoring system for first past session logs associated with (i) the identifier and (ii) a first portion of the telecommunications network; and
      querying the second dedicated monitoring system for second past session logs associated with (i) the identifier and (ii) a second portion of the telecommunications network; and
   receiving the past session logs comprises:
      receiving the first past session logs from the first dedicated monitoring system; and
      receiving the second past session logs from the second dedicated monitoring system.

3. The method of claim 1, further comprising:
   generating, by the system, without user intervention, and based at least in part on the past session logs, a report that includes session degradation information or session failure information; and
   sending the report to the user computing device.

4. The method of claim 3, further comprising:
   querying one or more data sources for contextual data associated with the past session logs; and
   receiving the contextual data associated with the past session logs,
   wherein generating the report is further based on the contextual data.

5. The method of claim 3, wherein:
   the past session logs include past call logs associated with a call; and
   the report includes the session failure information comprising at least one of:
      a drop time of the call that was dropped;
      a drop cause code of the call that was dropped; or
      one or more radio frequency characteristics at a geographical location where the call was dropped.

6. The method of claim 3, further comprising:
receiving, based on feedback from one or more users that analyzed additional past session logs, the data regarding root causes, within the telecommunications network, of the session degradations or the session failures exhibited in the additional past session logs; and
training the machine learning model using the training data to obtain the trained machine learning model, the training data including the additional past session logs and the data regarding the root causes,
wherein generating the report further comprises:
including the root cause in the session degradation information or the session failure information.

7. A method comprising:
receiving a request from a user computing device to access a system for monitoring at least one of a session degradation or a session failure of a communication session between subscribers in a telecommunications network;
requesting, by the system, a user of the user computing device to specify an identifier associated with a subscription to services provided by an operator of the telecommunications network;
receiving the identifier from the user computing device;
querying, by the system, multiple dedicated monitoring systems for past session logs associated with the identifier, the multiple dedicated monitoring systems monitoring respective portions of the telecommunications network, individual dedicated monitoring systems of the multiple dedicated monitoring systems being configured to obtain session logs comprising information relating to data packets of the communication session captured by a corresponding dedicated monitoring probe within the respective portion of the telecommunications network for the individual dedicated monitoring systems;
receiving first past session logs from a first dedicated monitoring system of the multiple dedicated monitoring systems;
receiving second past session logs from a second dedicated monitoring system of the multiple dedicated monitoring systems;
sending the first past session logs and the second past session logs to the user computing device; and
generating, using a trained machine learning model, a root cause within the telecommunications network of the at least one of the session degradation or the session failure of the communication session by processing the first past session logs and the second past session logs as input to the trained machine learning model and by performing deep packet inspection before the at least one of the session degradation or the session failure, wherein the trained machine learning model uses training data including additional past session logs and data regarding root causes of session degradations or session failures exhibited in the additional past session logs.

8. The method of claim 7, wherein:
requesting the user of the user computing device to specify the identifier further comprises requesting the user to specify an automation script that includes the identifier; and
querying the multiple dedicated monitoring systems is based at least in part on executing the automation script.

9. The method of claim 7, wherein requesting the user of the user computing device to specify the identifier further comprises causing a user interface to be displayed on a display of the user computing device, the user interface being configured to receive, via user input to the user computing device:
the identifier in the form of a subscription identifier;
a time window within which to collect the past session logs associated with the subscription identifier; and
a selection of multiple dedicated monitoring systems among a plurality of dedicated monitoring systems available for selection via the user interface,
the method further comprising receiving, via the user interface, the subscription identifier, the time window, and a selection of the multiple dedicated monitoring systems among the plurality of dedicated monitoring systems available for selection,
wherein querying the multiple dedicated monitoring systems is based at least in part on the subscription identifier, the time window, and the selection of the multiple dedicated monitoring systems.

10. The method of claim 7, further comprising:
generating, by the system, without user intervention, and based at least in part on the first past session logs and the second past session logs, a report that includes session degradation information or session failure information; and
sending the report to the user computing device.

11. The method of claim 10, wherein sending the first past session logs, the second past session logs, and the report to the user computing device comprises downloading the first past session logs, the second past session logs, and the report to a folder location on the user computing device specified by the user.

12. The method of claim 10, further comprising:
querying one or more data sources for contextual data associated with the past session logs; and
receiving the contextual data associated with the past session logs,
wherein generating the report is further based on the contextual data.

13. The method of claim 10, wherein:
the past session logs include past call logs associated with a call; and
the report includes the session failure information comprising at least one of:
a drop time of the call that was dropped;
a drop cause code of the call that was dropped; or
one or more radio frequency characteristics at a geographical location where the call was dropped.

14. The method of claim 10, further comprising:
receiving, based on feedback from one or more users that analyzed additional past session logs, the data regarding root causes, within the telecommunications network, of the session degradations or the session failures exhibited in the additional past session logs; and
training the machine learning model using the training data to obtain the trained machine learning model, the training data including the additional past session logs and the data regarding the root causes,
wherein generating the report further comprises:
including the root cause in the session degradation information or the session failure information.

15. The method of claim 7, further comprising:
determining that a subset of past session logs among the first past session logs and the second past session logs have a same format; and arranging the subset of past session logs having the same format in chronological order based at least in part on respective timestamps identified in the subset of past session logs.

16. A system comprising:
one or more processors; and
memory storing computer-executable instructions that, when executed by the one or more processors, cause the system to:
  receive a request from a user computing device to access the system for monitoring at least one of a session degradation or a session failure of a communication session between subscribers in a telecommunications network;
  request, via a user interface of the user computing device, an identifier associated with a subscription to services provided by an operator of the telecommunications network;
  receive the identifier from the user computing device;
  query multiple dedicated monitoring systems for past session logs associated with the identifier, the multiple dedicated monitoring systems monitoring respective portions of the telecommunications network, individual dedicated monitoring systems of the multiple dedicated monitoring systems being configured to obtain session logs comprising information relating to data packets of the communication session captured by a corresponding dedicated monitoring probe within the respective portion of the telecommunications network for the individual dedicated monitoring systems;
  receive first past session logs from a first dedicated monitoring system of the multiple dedicated monitoring systems, the first past session logs being associated with a first portion of the telecommunications network;
  receive second past session logs from a second dedicated monitoring system of the multiple dedicated monitoring systems, the second past session logs being associated with a second portion of the telecommunications network;
  send the first past session logs and the second past session logs to the user computing device; and
  generate, using a trained machine learning model, a root cause within the telecommunications network of the session degradation or the session failure of the communication session by processing the first past session logs and the second past session logs as input to the trained machine learning model and by performing deep packet inspection before the at least one of the session degradation or the session failure, wherein the trained machine learning model uses training data including additional past session logs and data regarding root causes of session degradations or session failures exhibited in the additional past session logs.

17. The system of claim 16, wherein:
requesting, via the user interface of the user computing device, the identifier further comprises causing the user interface to be displayed on a display of the user computing device, the user interface being configured to receive, via user input to the user computing device:
  the identifier as a subscription identifier;
  a time window within which to collect the past session logs associated with the subscription identifier; and
  a selection of at least one dedicated monitoring systems among a plurality of dedicated monitoring systems available for selection via the user interface, the computer-executable instructions, when executed by the one or more processors, further cause the system to receive, via the user interface, the subscription identifier, the time window, and a selection of the multiple dedicated monitoring systems among the plurality of dedicated monitoring systems available for selection; and
querying the multiple dedicated monitoring systems is based at least in part on the subscription identifier, the time window, and the selection of the multiple dedicated monitoring systems.

18. The system of claim 16, wherein the computer-executable instructions, when executed by the one or more processors, further cause the system to:
  generate, without user intervention, and based at least in part on the first past session logs and the second past session logs, a report that includes session degradation information or session failure information; and
  send the report to the user computing device.

19. The system of claim 18, wherein the computer-executable instructions, when executed by the one or more processors, further cause the system to:
  query one or more data sources for contextual data associated with the past session logs; and
  receive the contextual data associated with the past session logs,
  wherein generating the report is further based on the contextual data.

20. The system of claim 18, wherein:
the past session logs include past call logs associated with a call
the report includes the session failure information comprising at least one of:
  a drop time of the call that was dropped;
  a drop cause code of the call that was dropped; or
  one or more radio frequency characteristics at a geographical location where the call was dropped.

* * * * *